(12) United States Patent
Hyde et al.

(10) Patent No.: US 7,973,643 B2
(45) Date of Patent: *Jul. 5, 2011

(54) RFID READERS TRANSMITTING PREAMBLES DENOTING DATA RATE AND METHODS

(75) Inventors: John D. Hyde, Corvallis, OR (US); Christopher J. Diorio, Shoreline, WA (US)

(73) Assignee: Impinj, Inc., Seattle, WA (US)

(*) Notice: Subject to any disclaimer, the term of this patent is extended or adjusted under 35 U.S.C. 154(b) by 1789 days.

This patent is subject to a terminal disclaimer.

(21) Appl. No.: 10/890,662

(22) Filed: Jul. 13, 2004

(65) Prior Publication Data

US 2005/0237162 A1   Oct. 27, 2005

Related U.S. Application Data

(63) Continuation-in-part of application No. 10/823,991, filed on Apr. 13, 2004, now Pat. No. 7,183,926.

(60) Provisional application No. 60/570,247, filed on May 11, 2004.

(51) Int. Cl.
*H04Q 5/22* (2006.01)

(52) U.S. Cl. ............... 340/10.1; 340/12.1; 340/3.2

(58) Field of Classification Search ............ 340/10.1, 340/825.72, 825.69, 10.4, 870.14, 870.19, 340/3.2

See application file for complete search history.

(56) References Cited

U.S. PATENT DOCUMENTS

| | | | |
|---|---|---|---|
| 4,701,755 A | 10/1987 | Nakagawa et al. | |
| 4,783,783 A | 11/1988 | Nagai et al. | |
| 4,935,702 A | 6/1990 | Mead et al. | |
| 5,164,942 A | 11/1992 | Kamerman et al. | |
| 5,307,515 A | 4/1994 | Kuo et al. | |
| 5,491,484 A | 2/1996 | Schuermann | |
| 5,640,151 A | 6/1997 | Reis et al. | |
| 5,686,902 A * | 11/1997 | Reis et al. | 340/10.2 |
| 5,805,632 A | 9/1998 | Leger | |

(Continued)

FOREIGN PATENT DOCUMENTS

EP    0 298 618    1/1989

(Continued)

OTHER PUBLICATIONS

Invitation to Pay Additional Fees (Partial International Search), Application No. PCT/US 03/31792, date of mailing Apr. 22, 2004.

(Continued)

*Primary Examiner* — Vernal U Brown
(74) *Attorney, Agent, or Firm* — Turk IP Law, LLC

(57) ABSTRACT

RFID readers transmit data to query tags at one or more data rates. Before transmitting data, the RFID readers also transmit special preambles that inform of the data rate that will be used for transmitting the data. The preambles have a call aspect and a rate aspect. The rate aspect has a feature substantially determined from a rate selected for transmitting the data. The feature may encode the rate indirectly or explicitly. The call aspect may be implemented by call transitions that define a timing, whose duration is independent of the selected rate. The duration may be advantageously set according to an assumed state of the RFID tag bandwidth filter. Therefore an RFID tag may use the call aspect of the preamble to prepare itself for receiving data, and the rate aspect to determine its rate of transmission for setting its filter bandwidth accordingly.

52 Claims, 10 Drawing Sheets

U.S. PATENT DOCUMENTS

| | | | |
|---|---|---|---|
| 5,933,039 | A | 8/1999 | Hui et al. |
| 5,939,945 | A | 8/1999 | Thewes et al. |
| 5,952,922 | A | 9/1999 | Shober |
| 5,952,935 | A | 9/1999 | Mejia et al. |
| 6,130,632 | A | 10/2000 | Opris |
| 6,134,182 | A | 10/2000 | Pilo |
| 6,147,591 | A | 11/2000 | Stobbe et al. |
| 6,177,861 | B1 | 1/2001 | MacLellan et al. |
| 6,208,235 | B1 | 3/2001 | Trontelj |
| 6,266,362 | B1 | 7/2001 | Tuttle et al. |
| 6,317,027 | B1 | 11/2001 | Watkins |
| 6,320,788 | B1 | 11/2001 | Sansbury et al. |
| 6,357,025 | B1 | 3/2002 | Tuttle |
| 6,603,391 | B1 | 8/2003 | Greeff et al. |
| 6,617,962 | B1 * | 9/2003 | Horwitz et al. ............... 340/10.4 |
| 6,765,484 | B2 | 7/2004 | Eagleson et al. |
| 6,831,562 | B2 | 12/2004 | Rodgers et al. |
| 6,963,270 | B1 * | 11/2005 | Gallagher et al. ............ 340/10.2 |
| 7,005,965 | B2 | 2/2006 | Chen et al. |
| 7,039,412 | B2 | 5/2006 | Sandhu et al. |
| 7,044,387 | B2 * | 5/2006 | Becker et al. .................. 235/492 |
| 7,183,926 | B2 * | 2/2007 | Diorio et al. ................. 340/572.4 |
| 7,215,976 | B2 | 5/2007 | Brideglall |
| 7,356,316 | B2 | 4/2008 | Ogiso et al. |
| 2001/0010491 | A1 | 8/2001 | Marneweck et al. |
| 2002/0153996 | A1 | 10/2002 | Chan et al. |
| 2002/0167405 | A1 | 11/2002 | Shanks et al. |
| 2004/0174244 | A1 | 9/2004 | Eidemiller |
| 2005/0025187 | A1 | 2/2005 | Li et al. |
| 2005/0052279 | A1 * | 3/2005 | Bridgelall .................... 340/10.1 |
| 2005/0104790 | A1 | 5/2005 | Duron |
| 2005/0128159 | A1 | 6/2005 | Wang et al. |

FOREIGN PATENT DOCUMENTS

| | | |
|---|---|---|
| EP | 0 681 192 | 11/1995 |
| EP | 0 696 852 | 2/1996 |
| EP | 0 715 417 | 6/1996 |
| EP | 0 939 496 | 9/1999 |
| WO | 01 73854 | 10/2001 |

OTHER PUBLICATIONS

Carley, L. Richard, "Trimming Analog Circuits Using Floating-Gate Analog MOS Memory", IEEE Journal of Solid-State Circuits, vol. 24, No. 6, Dec. 1989, pp. 1569-1575.

Jonietz, Erika, "Tracking Privacy", Technology Review, Jul./Aug. 2004, pp. 74-75.

Raszka et al., "Embedded Flash Memory for Security Applications in a 0.13 μm CMOS Logic Process", Digest of Technical Papers, IEEE International Solid-State Circuits Conference 2004, p. 46.

Weis, Stephen A., et al., Security and Privacy Aspects of Low-Cost Radio Frequency Identification Systems, Laboratory for Computer Science, Auto-ID Center, Massachusetts Institute of Technology, pp. 1-12.

Yoshida, Junko, "RFID "kill" Feature Aims to Soothe Privacy Fears", EE Times, Apr. 28, 2003, pp. 1, 86.

International Search Report, for International Application No. PCT/US2005/012490, date mailed Jul. 25, 2005.

Written Opinion of the International Preliminary Examining Authority for International Application No. PCT/US05/12490, date of mailing Jun. 27, 2006.

* cited by examiner

514 →

| 527 CALL ASPECT | 529 RATE ASPECT |

*PREAMBLE ASPECTS*

| 637 CALL PORTION (CALL ASPECT) | 639 RATE PORTION (RATE ASPECT) |

*PREAMBLE PORTIONS*

| 747 DELIMITER (CALL ASPECT) (RATE ASPECT) (NO ASPECT) | 748 VIOLATION (CALL ASPECT) (RATE ASPECT) (NO ASPECT) | 749 DATA SAMPLE(S) (IF USED) (RATE ASPECT) (PREAMBLE CONF.) |

*PREAMBLE ASPECT IMPLEMENTATION OPTIONS*

FIGURE 7

RFID READERS TRANSMITTING PREAMBLES DENOTING DATA RATE AND METHODS

RELATION TO OTHER APPLICATIONS

This application claims benefit of U.S. Provisional Patent Application Ser. No. 60/570,247 filed May 11, 2004 in the name of inventors John D. Hyde and Christopher J. Diorio entitled "RFID Readers Transmitting Preambles For Data At Different Transmission Rates And Software And Methods" and being commonly assigned herewith. This application is also a continuation-in-part of co-pending U.S. patent application Ser. No. 10/823,991, filed Apr. 13, 2004 now U.S. Pat. No. 7,183,926 in the name of inventors Christopher J. Diorio, Scott Anthony Cooper, John D. Hyde, Amir Sarajedini and Kurt Eugene Sundstrom, entitled "Adaptable Bandwidth RFID Tags", all commonly assigned herewith. This application may be found to be related to another U.S. patent application titled "RFID Readers Transmitting Preambles Denoting Communication Parameters And RFID Tags Interpreting The Same And Methods", having attorney docket number IMPJ-0095, filed on the same day as the present application, receiving Ser. No. 10/890,976 and assigned commonly herewith.

FIELD OF THE INVENTION

The present invention is related to the field of Radio Frequency IDentification (RFID) readers, and more specifically to RFID readers able to inform of the transmission rate of their data.

BACKGROUND

Radio Frequency IDentification (RFID) systems include RFID readers and RFID tags. The tags can be used in many ways for locating and identifying objects that they are attached to. RFID tags are particularly useful in product-related and service-related industries for tracking large numbers of objects are being processed, inventoried, or handled. In such cases, an RFID tag is usually attached to individual items, or to their packages.

In principle, RFID techniques entail using an RFID reader to interrogate one or more RFID tags. Interrogation is performed by the reader transmitting a Radio Frequency (RF) wave. A tag that senses the interrogating RF wave responds by transmitting back another RF wave, a process known as backscatter. Backscatter may take place in a number of ways. The response may further encode a number stored internally in the tag. The response, and the number if available, is decoded by the reader, which thereby identifies, counts, or otherwise interacts with the associated item. The number can denote a serial number, a price, a date, a destination, other attribute(s), any combination of attributes, and so on.

An RFID tag typically includes an antenna system, a power management section, a radio section, a logical section, and a memory. Advances in semiconductor technology have miniaturized the electronics so much that an RFID tag can generate the backscatter while powered by only the RF signal it receives, enabling some RFID tags to operate without a battery.

A challenge in the operation of RFID systems arises when a tag or population of tags does not know what data rate will be used by the reader.

Another challenge in the operation of RFID systems arises from interference, when other RF signals are also transmitted in the vicinity at the same time. Interfering RF signals may be generated, for example, from nearby wireless devices such as other RFID readers, and also cordless telephones, wireless baby monitors, and the like. In those instances, an RFID tag cannot detect the interrogating RF wave reliably, or parse its commands.

BRIEF SUMMARY

The invention improves over the prior art. Briefly, the present invention provides RFID readers that transmit data to query tags at one or more data rates. Before transmitting the data, the RFID readers also transmit special preambles that inform of the data rate that will be used for transmitting the data. The invention also provides methods for transmitting the preambles.

The preambles of the invention have a rate aspect, which has a feature substantially determined from the data rate that the data will be transmitted. The preambles of the invention also have a call aspect, which may be implemented by call transitions that define a timing whose duration is independent of the data rate that will be used. In fact, it is preferred that this duration be set according to an assumed state of the tag.

The invention can be used with RFID tags that have one or more filters, each with a different bandwidth setting. Indeed, upon receiving the preamble of the reader of the invention, such tags can parse the rate aspect and adjust accordingly their filter bandwidth in reception mode.

Additionally, while waiting for a preamble, all tags can set their bandwidth at the same setting. This setting may be chosen advantageously to be of the lowest bandwidth. In parallel, the assumed state of the tag for purposes of the call aspect of the reader can be that the setting is at the lowest bandwidth.

In some embodiments of the invention, the RFID reader can choose one of many data rates. This is especially advantageous where interference is detected, and transmission at a more suitable data rate is attempted. Indeed, when an RFID reader detects that there is interference, it may lower the data rate of its transmission. This will permit any RFID tags that receive the transmission to better reject interference from the transmitted data, and to analyze the transmitted data more robustly.

These and other features and advantages of the invention will be better understood from the specification of the invention, which includes the following Detailed Description and accompanying Drawings.

BRIEF DESCRIPTION OF THE DRAWINGS

The invention will become more readily apparent from the following Detailed Description, which proceeds with reference to the accompanying drawings, in which:

FIG. 5 is a diagram showing aspects of a preamble transmitted by a reader made according to an embodiment of the present invention.

FIG. 6 is a data diagram showing distinct portions of a preamble implementing distinct ones of the aspects of FIG. 5, transmitted by a reader according to an embodiment of the present invention.

FIG. 7 is a diagram showing capabilities of distinct portions of a sample preamble to implement aspects of FIG. 5, for readers according to different embodiments of the present invention.

DETAILED DESCRIPTION

Figure 1:
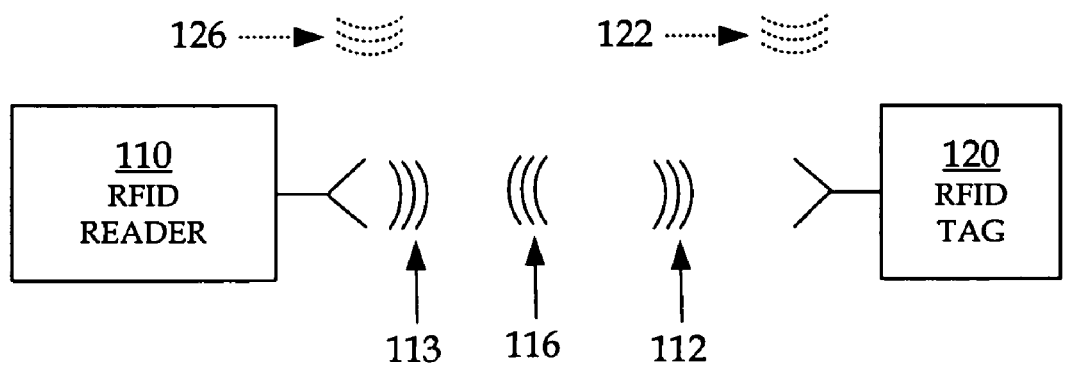
FIG. 1 is a block diagram of an RFID reader according to the invention, used in a system.

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. This description is, therefore, not to be taken in a limiting sense.

As has been mentioned, the present invention provides RFID readers that transmit data to query tags at one or more data rates. The RFID readers also transmit special preambles for these data transmissions, which inform of the rate of data transmission. The invention is now described in more detail.

An RFID reader might want to transmit to an RFID tag at different data rates, which are also called link rates and just rates. In general, a higher data rate will result in a quicker transmission time, which is desirable. In the presence of interference, however, detection of the RFID signals might not be robust at the higher rates, and a lower rate might be desired. An example is described below.

FIG. 1 is a diagram of an RFID system 100 according to an embodiment of the invention. An RFID reader 110 transmits an interrogating RF wave, which may be continuous. Two RF signals 112, 113 of the interrogating RF wave are shown as discontinuous, to denote their possibly different treatment, but that is only for illustration and they may, in fact, be part of the same continuous signal. An RFID tag 120 in the vicinity of RFID reader 110 may sense the interrogating RF wave, and generate backscatter 116. RFID reader 110 senses and interprets backscatter 116.

In the vicinity of system 100 there is also interference, shown here in the form of RF waves 122, 126 from another other source (not shown). RF wave 126 arrives at reader 110 at the same time as backscatter signal 116. While RF wave 126 might not have the same carrier frequency as backscatter signal 116, it might nevertheless generate interference. Reader 110 may infer accordingly that RF wave 122 is also arriving at tag 120 at the same time as intended interrogating signal 112, and be generating interference there. Accordingly, RFID reader 110 might want to use a different rate to transmit to tag 120.

Different link rates may be used. Their values may be selected from a continuum, such as being continuously variable between two endpoints, such as 32 kbps and 128 kbps. ("kbps" stands for 1000 bits per second.) Alternately, values of link rates may be selected from one or more groups of values. One group that can be chosen is approximately 32 kbps, approximately 64 kbps, and approximately 128 kbps. Another group is approximately 40 kbps, approximately 80 kbps, and approximately 160 kbps. One more group is approximately 26.7 kbps, approximately 53.3 kbps, and approximately 106.7 kbps, which can advantageously be used for 2/1 Pulse Interval Encoding ("PIE").

Figure 2:
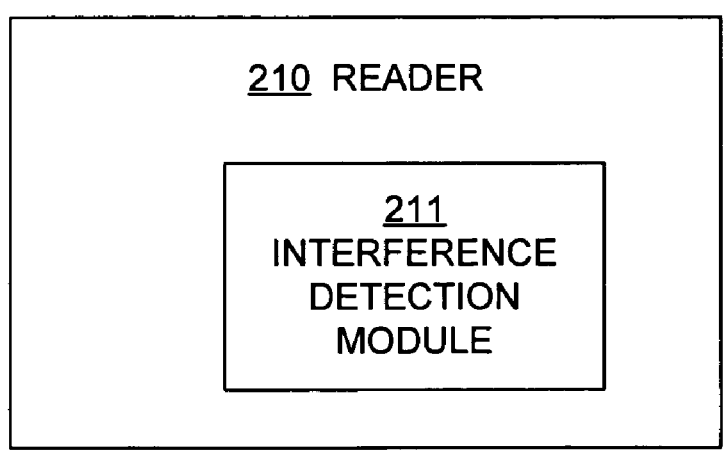
FIG. 2 is a block diagram of an RFID reader according to an embodiment of the invention that includes an interference detection module.

FIG. 2 is a block diagram of RFID reader 210 according to an embodiment of the invention. Reader 210 may be employed for reader 110 in FIG. 1, but that is not necessary. Reader 210 includes an interference detection module 211, which is used for detecting the presence of signal 126, and thus also inferring the presence of signal 122. Module 211 may be implemented in any way known in the art, such as by software, hardware such as with analog or digital components, microprocessors, Application Specific Integrated Circuits (ASICs), and so on.

Module 211 has an output as to whether interference is taking place, and a link rate is selected according to the output. A module 211 is not required, however, to practice the invention, and an RFID reader according to the invention might decide on rates not based on detecting interference.

Figure 3:
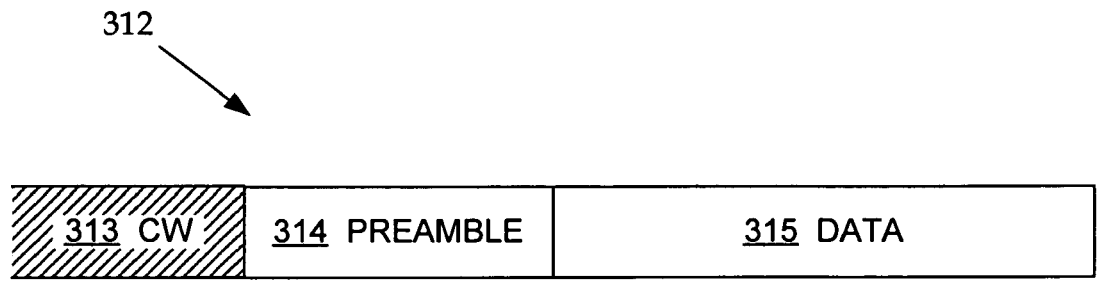
FIG. 3 is a data diagram showing a possible relationship of a preamble to transmitted data.

FIG. 3 is a data diagram showing a transmission 312 from a reader to a tag, which may be encoded in signals 112, 113, a continuous version of them, and so on. A reader may first transmit a Continuous Wave ("CW") portion 313, then a preamble 314, and then data 315.

Figure 4:
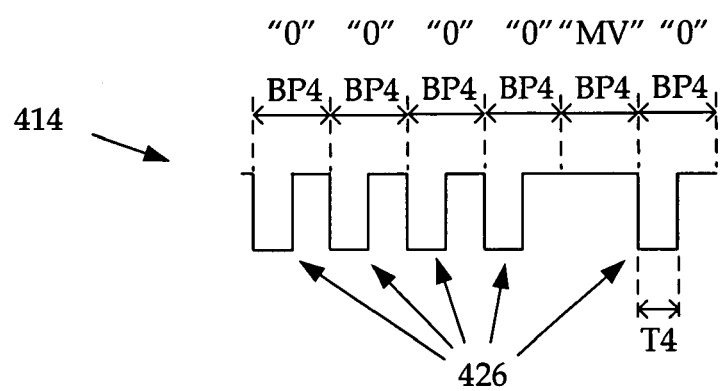
FIG. 4 is a waveform depicting a preamble in the prior art.

FIG. 4 is a waveform depicting a preamble 414, determined by convention in the prior art. Preamble 414 includes five low pulses 426, each of which has the same duration T4. The exact arrangement of low pulses 426 is along 6 consecutive bit periods, each with a duration BP4 as shown. The first four of the 6 bit periods include a low-to-high transition, which by convention is also known as an encoded symbol "0". The fifth bit period contains no transition, which is a specific type of violation MV. The sixth bit period contains another low-to-high transition, and completes the preamble 414.

Preamble 414 has problems, if it is to be used for different transmission rates. The entire waveform would scale, so that bit period BP4 (and low pulse duration T4) would be preserved according to the data rate. The problem is that different data rates might vary by a factor of two or four from each other. A bandwidth setting in the tag that can detect transmission at one rate may fail in the other, since the pulses of preamble 414 will have such a different timing and width.

FIG. 5 shows aspects of a preamble 514 transmitted by a reader made according to an embodiment of the invention. Preamble 514 has a call aspect 527 and a rate aspect 529.

Call aspect 527 may be implemented by call transitions, which may be high to low, low to high, or both. The call transitions define a timing whose duration is independent of the selected rate. In other words, the duration does not scale with the bit period, or inversely with the rate of the data transmission, as does preamble 414.

In some embodiments; the duration of the timing of the call transitions is substantially determined from an assumed state of the tag. In other words, the reader makes an assumption about the tag, and transmits preamble 514 accordingly. In these embodiments, the assumed state of the tag is that a reception filter is set at a bandwidth so as to detect a transmission at an extreme one of the possible link rates. It is preferred that the extreme rate be advantageously the lowest one of the rates, so that a tag might use narrow bandwidth while detecting CW313, and waiting for a preamble.

In such embodiments, the call transitions may define at least one low pulse. The low pulse can have a duration determined in accordance with the expected filter bandwidth value. For example, if the tags are assumed to be waiting with a filter bandwidth setting for 40 kpbs, the duration may be approximately 12.5 μsec.

Rate aspect 529 that has a feature substantially determined from the selected rate, and at which the data will subsequently be transmitted. Accordingly, rate aspect 529 denotes the data rate, which is the rate of impending transmission of the data. For example, the rate aspect may be implemented by rate transitions that replicate at least one data sample. Once rate aspect 529 is received by the RFID tag, it may be used advantageously to adjust its filter bandwidth, and to confirm the conclusion of the preamble.

FIG. 6 is a data diagram of an embodiment of a preamble 614 according to the invention, where a call portion 637 implements the call aspect, and a rate portion 639 implements the rate aspect. In preamble 614, call portion 637 is distinct from rate portion 639, although that is not necessary for practicing the invention.

Further in preamble 614, call portion 637 occurs before rate portion 639. This is preferred, but not necessary for practicing the invention. Examples of both implementations will be given below.

FIG. 7 is a data diagram of a preamble 714, which has a delimiter 747, a violation 748, and data sample(s) 749. Preamble 714 is given as a map for constructing many possible embodiments according to the invention. In particular, different portions of preamble 714 can implement call aspect 527 and rate aspect 529 of FIG. 5.

In preamble 714 of FIG. 7, a delimiter 747 can implement either call aspect 527, or rate aspect 529, or none of them. So, when it implements call aspect 527 but not rate aspect 529, delimiter 747 can be a low pulse whose duration is independent of the selected rate, unlike preamble 414.

Additionally in preamble 714, violation 748 can implement either call aspect 527, or rate aspect 529, or none of them. So, when it implements call aspect 527 but not rate aspect 529, violation 748 may have a duration independent of the selected rate, unlike preamble 414. Alternately, violation 748 may implement the rate aspect by having a duration that corresponds to the selected rate. The selected rate may be inversely proportional to the duration, or encoded in the duration.

Data sample(s) 749, if included, can implement the rate aspect, and confirm the end of the preamble. Indeed, a tag may decode them to determine the rate that the impending data will be received at.

A number of possible reader waveforms will now be described. While in each example a group of three data rates will be shown, such is not necessary, and a different number of rates is also possible.

Figure 8:
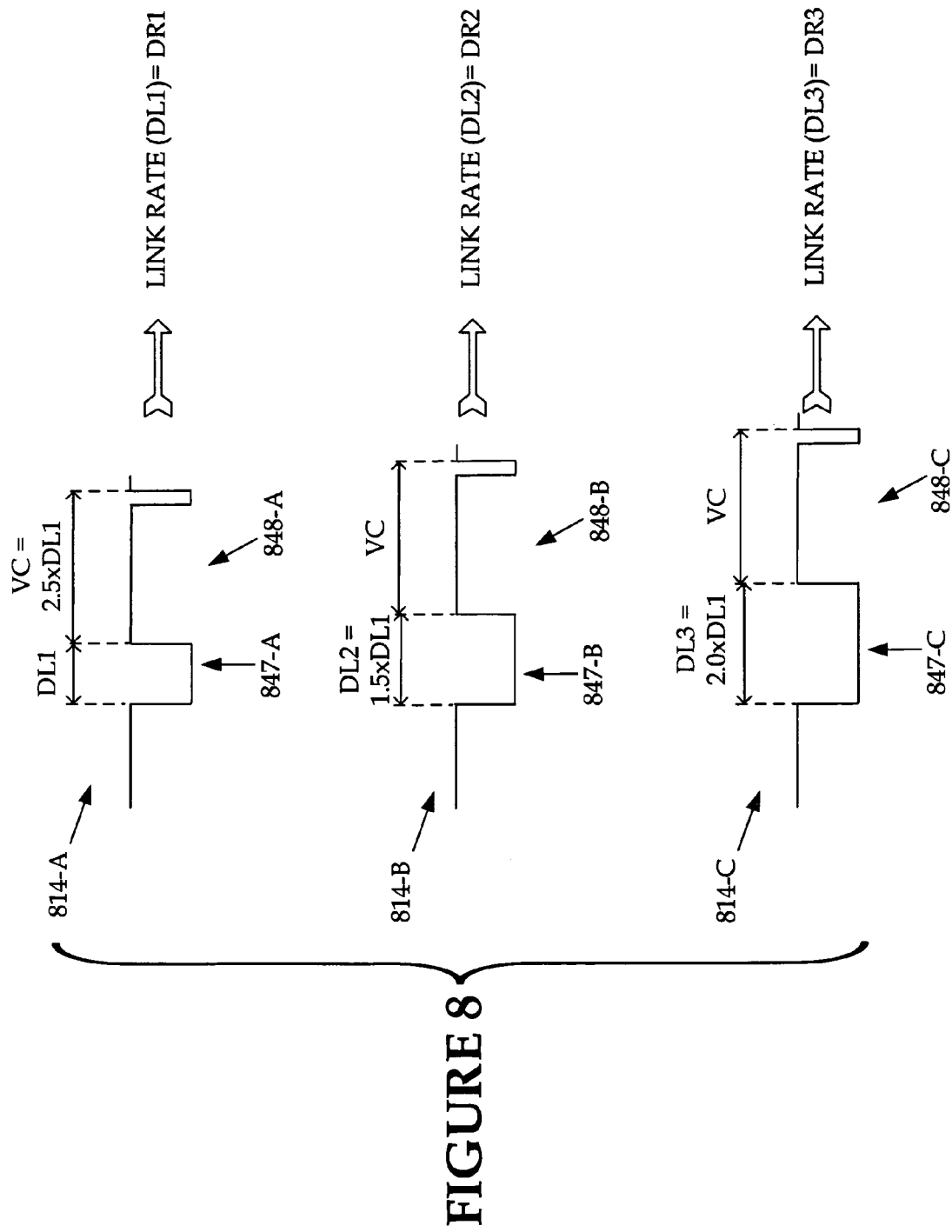
FIG. 8 shows three preamble waveforms for a reader according to the present invention to transmit data at different rates according to an embodiment of the invention.

FIG. 8 shows three preamble waveforms 814-A, 814-B, 814-C for a reader according to the present invention. Waveform 814-A includes a delimiter low pulse 847-A of duration DL1, and a violation 848-A of duration VC=2.5×DL1. Waveform 814-B includes a delimiter low pulse 847-B of duration DL2, and a violation 848-B of duration VC as above. Duration DL2 is chosen to be 1.5 times that of DL1. Waveform 814-C includes a delimiter low pulse 847-C of duration DL3, and a violation 848-C of duration VC as above. Duration DL3 is chosen to be 2.0 times that of DL1.

In each case of FIG. 8, the call aspect is implemented at least by violations 848-A, 848-B, 848-B. The rate aspect is implemented by the duration of delimiter pulses 847-A, 847-B, 847-C, in determining which one of link rates DR1, DR2, DR3 has been selected. Duration DL1 can be long enough so that its end will be detected even at a low bandwidth setting. It is the differences between DL1, DL2, DL3 that encode the rate aspect.

Figure 9:
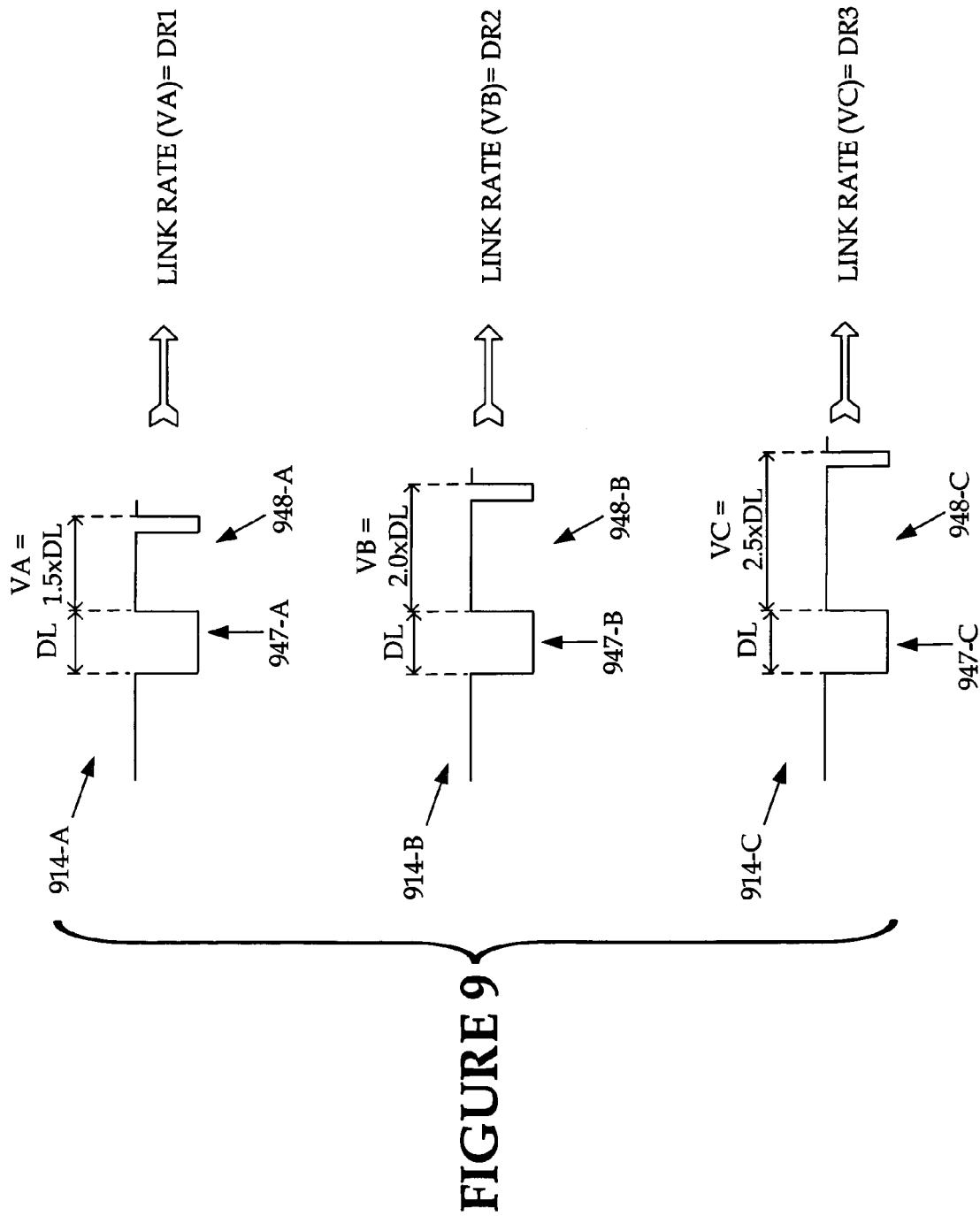
FIG. 9 shows three preamble waveforms for a reader according to the present invention to transmit data at different rates according to another embodiment of the invention.

FIG. 9 shows three preamble waveforms 914-A, 914-B, 914-C for a reader according to the present invention. Waveform 914-A includes a delimiter low pulse 947-A of duration DL, and a violation 948-A of duration VA=1.5×DL. Waveform 914-B includes a delimiter low pulse 947-B of duration DL as above, and a violation 948-B of duration VB=2.0×DL. Waveform 914-C includes a delimiter low pulse 947-C of duration DL as above, and a violation 948-C of duration VC=2.5×DL.

It will be appreciated that, in each case of FIG. 9, the call aspect is implemented by delimiter pulses 947-A, 947-B, 947-C, all of which are of the same duration DL regardless of the selected rate. Duration DL is chosen as per the above. The rate aspect is implemented by the duration of violations 948-A, 948-B, 948-C, in determining which one of link rates DR1, DR2, DR3 has been selected. In this example, the duration is encoded in, but not proportional to, the duration of violations 948-A, 948-B, 948-C.

Figure 10:
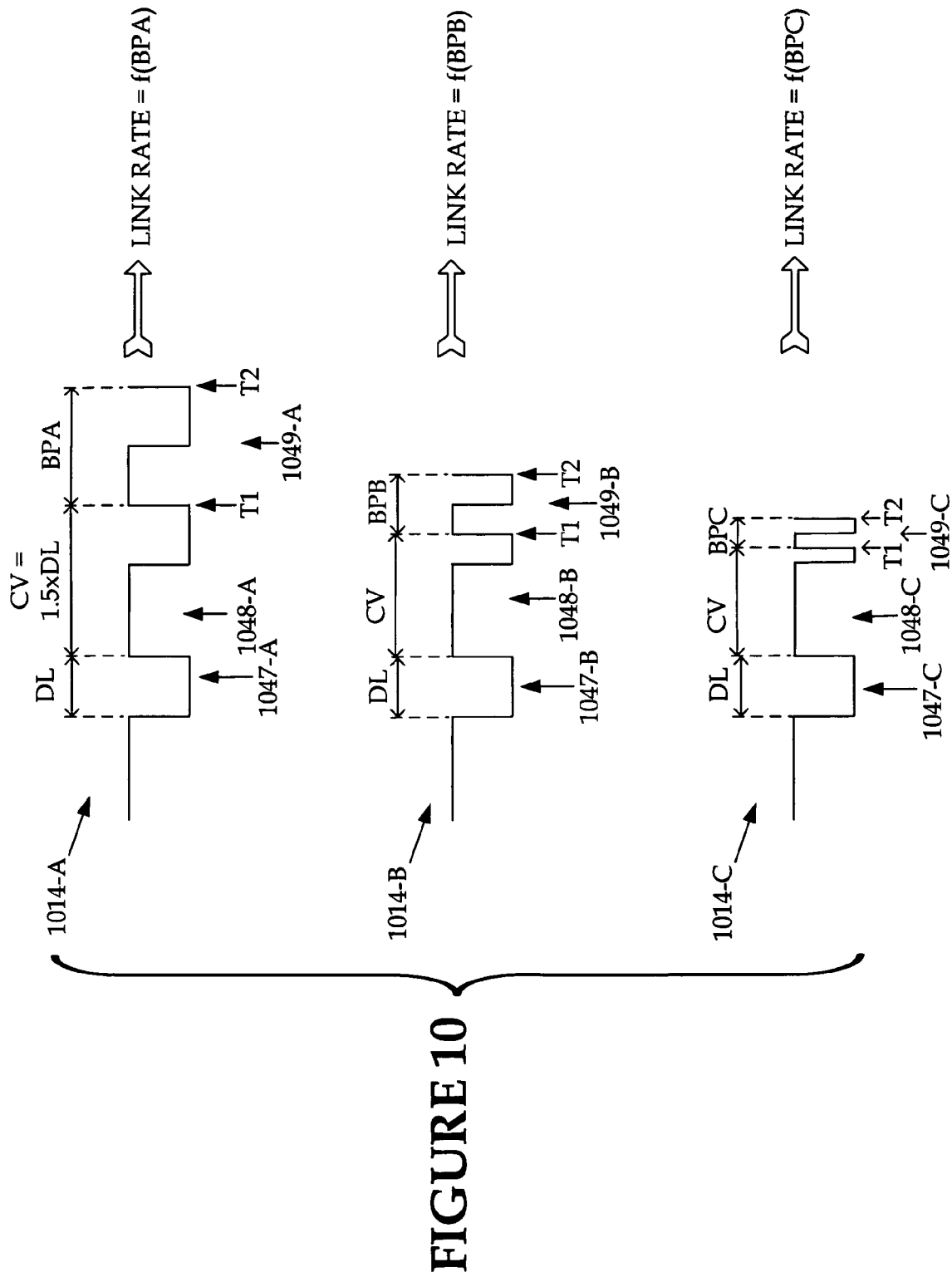
FIG. 10 shows three preamble waveforms for a reader according to the present invention to transmit data at different rates according to yet another embodiment of the invention.

FIG. 10 shows three preamble waveforms 1014-A, 1014-B, 1014-C for a reader according to the present invention. Waveform 1014-A includes a delimiter low pulse 1047-A of duration DL, a violation 1048-A of duration CV=1.5×DL, and a data sample portion 1049-A that defines a bit period BPA. Waveform 1014-B includes a delimiter low pulse 1047-B of duration DL as above, a violation 1048-B whose high duration is the same as that of duration 1048-A as above, and a data sample portion 1049-B that defines a bit period BPB. Waveform 1014-C includes a delimiter low pulse 1047-C of duration DL as above, a violation 1048-C whose high duration is the same as that of duration 1048-A as above, and a data sample portion 1049-C that defines a bit period BPC.

It will be appreciated that, in each case of FIG. 10, the call aspect is implemented by delimiter pulses 1047-A, 1047-B, 1047-C, all of which are of the same duration regardless of the selected rate, along with violations 1048-A, 1048-B, 1048-C, all of which have the same high duration. The rate aspect is implemented by the duration of data sample portions 1049-A, 1049-B, 1049-C. Indeed, respective bit periods BPA, BPB, BPC are detected and used to determine which one of link rates DR1, DR2, DR3 has been selected. The rate is found from the inverse of the bit period, and so on. In waveforms 1014-A, 1014-B, 1014-C, the link rate is detected at times T1, and the end of the preamble is confirmed at times T2.

Figure 11:
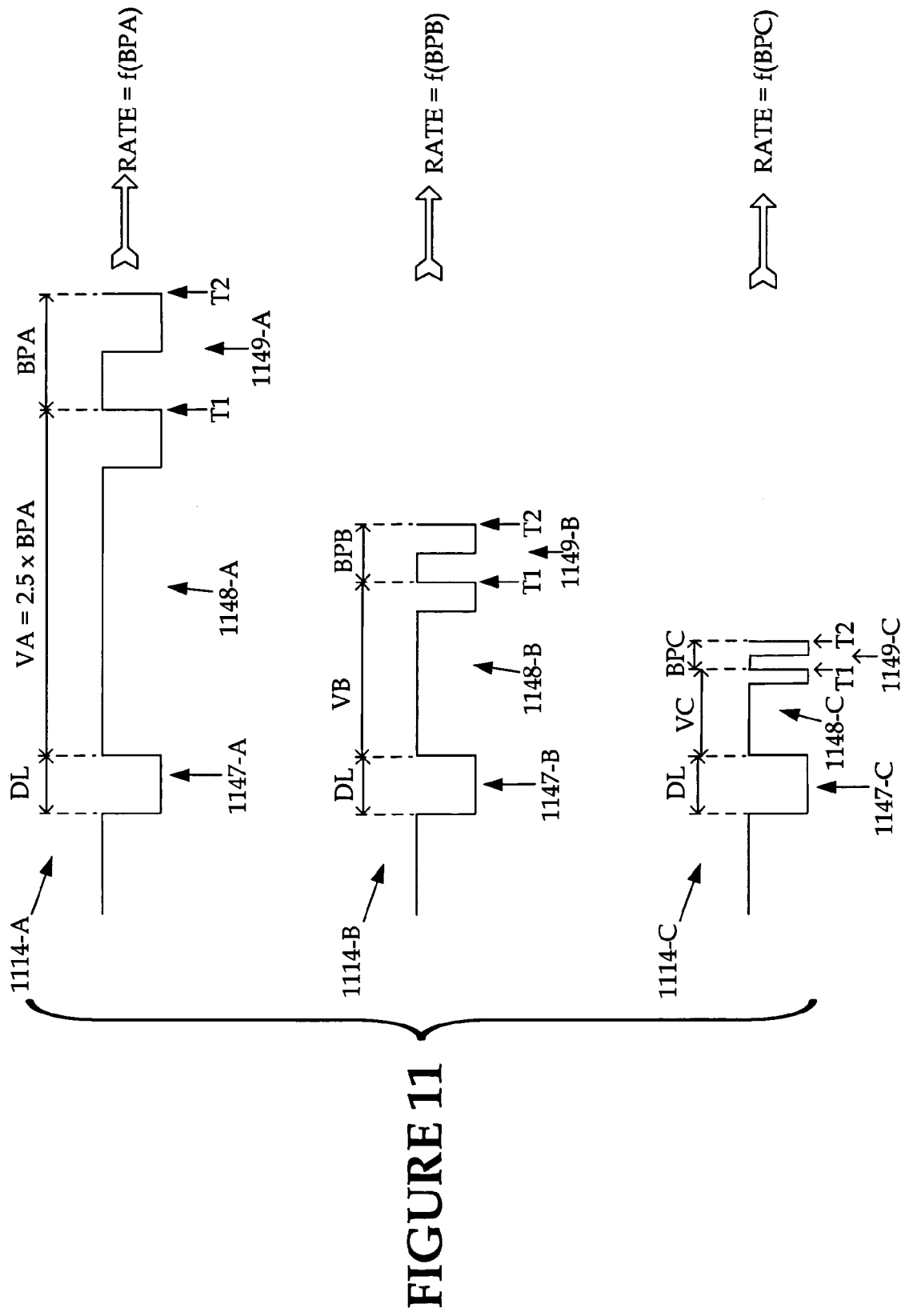
FIG. 11 shows three preamble waveforms for a reader according to the present invention to transmit data at different rates according to one more embodiment of the invention.

FIG. 11 shows three preamble waveforms 1114-A, 1114-B, 1114-C for a reader according to the present invention. Waveform 1114-A includes a delimiter low pulse 1147-A of duration DL, a violation 1148-A, and a data sample portion 1149-A that defines a bit period BPA. Violation 1148-A has a duration VA=2.5×BPA. Waveform 1114-B includes a delimiter low pulse 1147-B of duration DL as above, a violation 1148-B, and a data sample portion 1149-B that defines a bit period BPB. Violation 1148-B has a duration VB=2.5×BPB.

Waveform 1114-C includes a delimiter low pulse 1147-C of duration DL as above, a violation 1148-C, and a data sample portion 1149-C that defines a bit period BPC. Violation 1148-C has a duration VC=2.5×BPC. In all three instances, violations 1148-A, 1148-B, 1148-C have durations proportional to their respective bit periods, which therefore scale inversely with the data rate.

It will be appreciated that, in each case of FIG. 11, the call aspect is implemented by delimiter pulses 1147-A, 1147-B, 1147-C, all of which are of the same duration regardless of the selected rate. The rate aspect is implemented at least by the duration of data sample portions 1149-A, 1149-B, 1149-C, as was done for FIG. 10.

Additionally, in FIG. 11, the rate aspect is also implemented by the duration of the violations. The duration can be inversely proportional to the rate. For example, the duration may equal an integer multiple of the duration of a data sample.

For the remaining two examples of waveforms, an additional perspective may be advantageously employed, that of seeing the preamble as a collection of low pulses. It will be recalled that in preamble 414 of the prior art, all low pulses had equal durations. In contradistinction, the preambles of the present invention include at least two low pulses of different durations.

The invention further provides readers that can transmit at a single link rate, where the preamble includes at least two low pulses of different durations.

If the data is to be transmitted at a first rate, one of these two low pulses—also called a compliant pulse—has a duration according to the first rate. The compliant pulse may be a sample data pulse. Additional sample data pulses may be included in other places of the preamble, as will be shown in more detail below. For example, referring briefly back to FIG. 11, delimiter pulse 1147-A is a compliant pulse, since it has the same duration as those in data sample portion 1149-A.

The other low pulse, also known as a non-compliant pulse, may occur first, as also per the above. The non-compliant pulse may have a duration that is approximately an integer multiple of the duration of the compliant low pulse. For example, referring briefly back to FIG. 11, delimiter pulse 1147-B is a non-compliant pulse, since it has a duration different from those in data sample portion 1149-B.

In some embodiments, a low pulse may have a duration of approximately 12.5 μsec or approximately 6.25 μsec. Alternately, the duration may be within a range, such as between a preset minimum and a preset maximum value.

In general, for transmitting at a second one of the link rates, the reader may be capable of using a second preamble, different from the first preamble that is used for transmitting at the first link rate. In one of these embodiments, the second preamble may have a compliant low pulse of a duration substantially similar to a duration of a non-compliant pulse of the first preamble.

Figure 12:
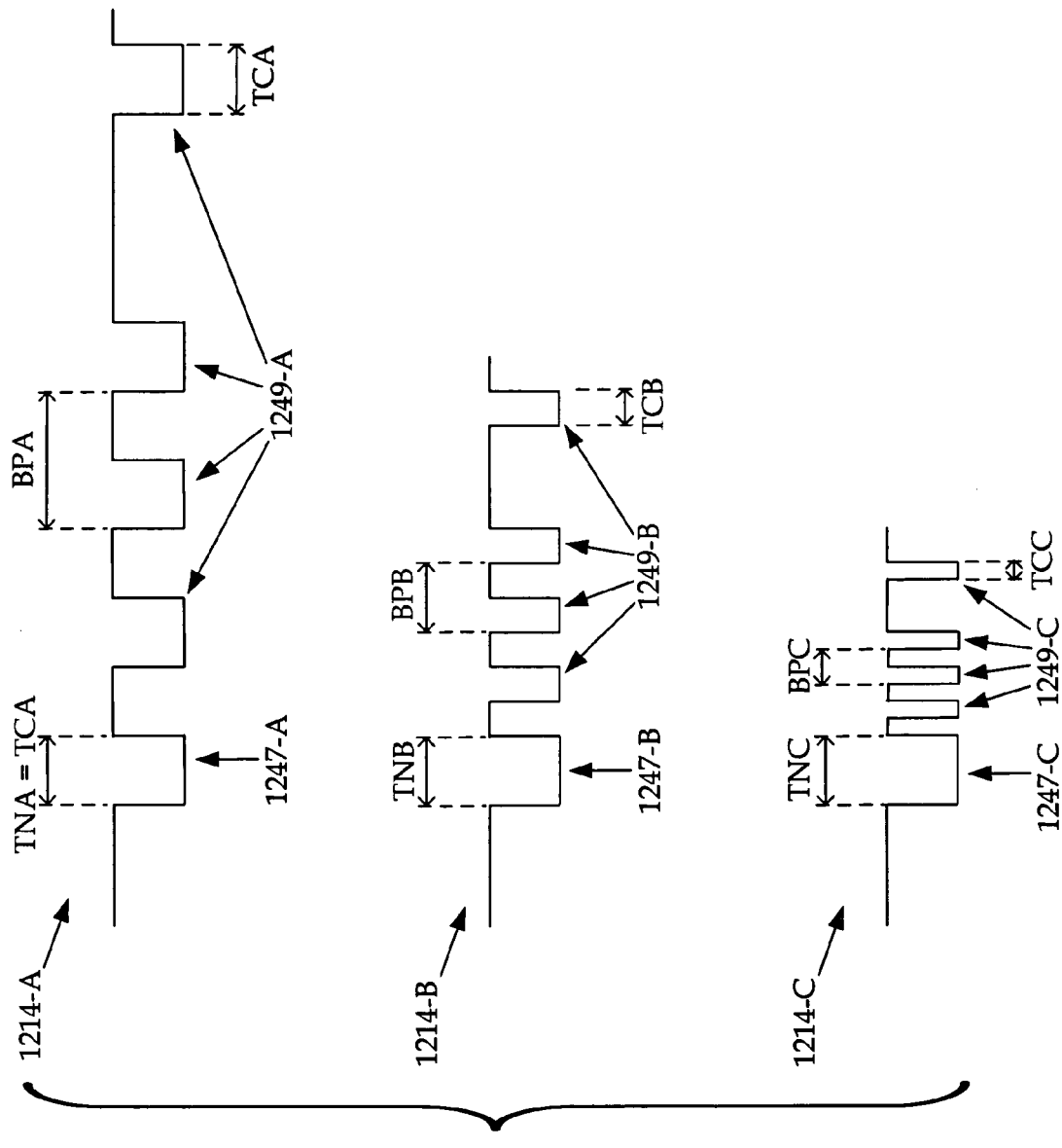
FIG. 12 shows three preamble waveforms for a reader according to the present invention to transmit data at different rates according to an additional embodiment of the invention.

FIG. 12 shows three preamble waveforms 1214-A, 1214-B, 1214-C for a reader according to the present invention. Waveform 1214-A includes a delimiter low pulse 1247-A of duration TNA, and a plurality of compliant low pulses 1249-A of duration TCA that define a bit period BPA. In this particular case, duration TNA equals duration TCA, and thus delimiter low pulse 1247-A is also a compliant pulse. Waveform 1214-B includes a non-compliant delimiter low pulse 1247-B of duration TNB, and a plurality of compliant low pulses 1249-B of duration TCB that define a bit period BPB. Waveform 1214-C includes a non-compliant delimiter low pulse 1247-C of duration TNC, and a plurality of compliant low pulses 1249-C of duration TCC that define a bit period BPC. It will be appreciated that, from this perspective of the invention, a violation is expressed also in terms of a delay between the low pulses, and thus need not be defined.

It will be recognized that preamble waveforms 1214-A, 1214-B, 1214-C are somewhat similar to preamble 414, except the first low pulse in each case does not necessarily scale with the bit period. While in waveform 1214-A the duration of delimiter low pulse 1247-A is the same as remaining low pulses 1249-A, that is one design choice and certainly not necessary for practicing the invention.

In the preferred embodiment, delimiter low pulses 1247-A, 1247-B, and 1247-C have substantially the same duration. The duration can further be set by making an assumption about a state of the tag, as per the above.

Figure 13:
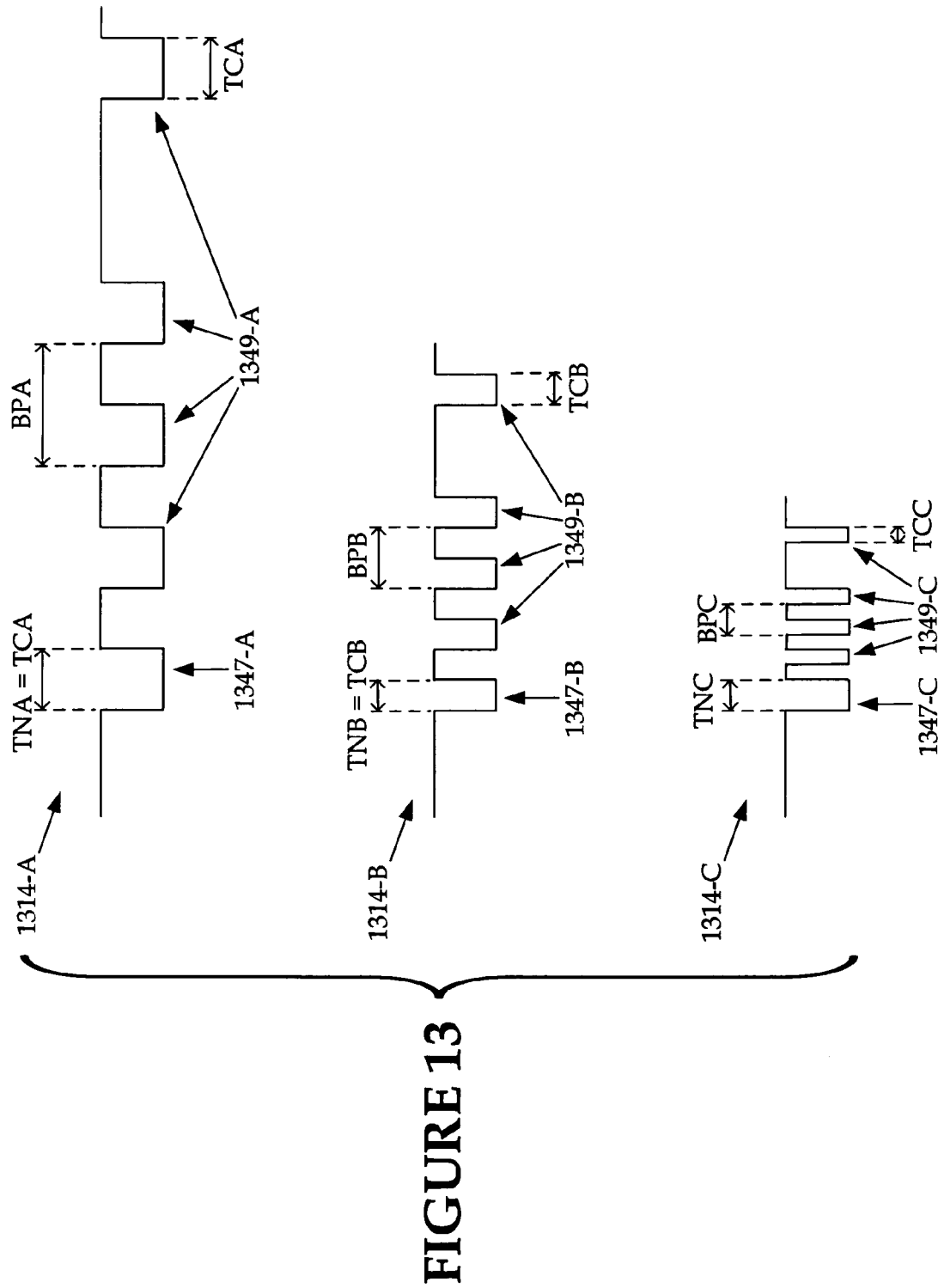
FIG. 13 shows three preamble waveforms for a reader according to the present invention to transmit data at different rates according to one more embodiment of the invention.

FIG. 13 shows three preamble waveforms 1314-A, 1314-B, 1314-C for a reader according to the present invention. Waveform 1314-A includes a delimiter low pulse 1347-A of duration TNA, and a plurality of compliant low pulses 1349-A of duration TCA that define a bit period BPA. In this particular case, duration TNA equals duration TCA, and thus delimiter low pulse 1347-A is also a compliant pulse. Waveform 1314-B includes a delimiter low pulse 1347-B of duration TNB, and a plurality of compliant low pulses 1349-B of duration TCB that define a bit period BPB. In this particular case of FIG. 13 only, duration TNB also equals duration TCB, and thus delimiter low pulse 1347-B is also a compliant pulse. Waveform 1314-C includes a non-compliant delimiter low pulse 1347-C of duration TNC, and a plurality of compliant low pulses 1349-C of duration TCC that define a bit period BPC.

It will be recognized that these are similar to those of FIG. 12, except that first low pulses 1347-B, 1347-C are only half the duration of first low pulse 1347-A.

As mentioned above, rates may change as the environment changes. Accordingly, the same reader may end up transmitting at a first data rate, then at a second data rate. For the example, in FIG. 1, each of pulses 112, 113 may include a preamble and associated data, the data being at different rates. In each case, the preamble may warn of the upcoming rate, as shown for example in FIG. 8, FIG. 9, FIG. 10, FIG. 11, FIG. 12, FIG. 13, so that the tags can adjust.

As mentioned above, rates may change even as the environment changes. Accordingly, the same reader may end up transmitting at a first data rate, then at a second data rate. For the example, in FIG. 1, each of pulses 112, 113 may include a preamble and associated data, the data being at different rates. In each case, the preamble may warn of the upcoming rate, as shown for example in FIG. 8, FIG. 9, FIG. 10, FIG. 11, FIG. 12, FIG. 13, so that the tags can adjust.

Figure 14:
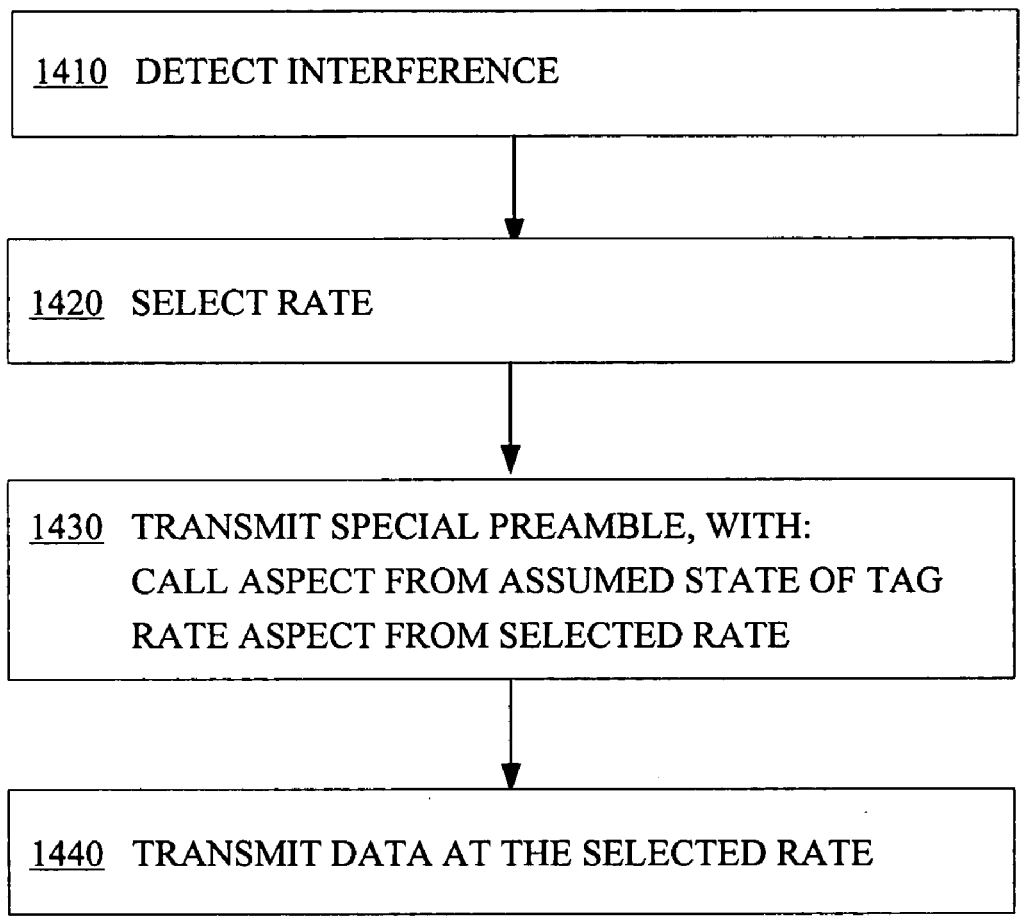
FIG. 14 is a flowchart illustrating a method according to an embodiment of the invention.

FIG. 14 is flowchart 1400 illustrating a method according to an embodiment of the invention. The method of flowchart 1400 may also be practiced by reader 110, reader 210, and so on.

At block 1410, optionally interference is detected. Detection is by an interference detection module, if one is provided.

At next block 1420, a rate is selected, optionally depending on a detected interference.

At next block 1430, a preamble is transmitted which includes a call aspect and a rate aspect. In some embodiments, a call portion is transmitted that includes the call transitions, and a distinct rate portion is transmitted that implements the rate aspect. In one of those embodiments, the call portion is transmitted before the rate portion.

The call aspect is implemented by call transitions that define a timing whose duration is independent of the selected rate. Preferably the duration is determined from an assumed state of the tag. The call aspect may be implemented by a low delimiter pulse, or by a high violation pulse, as per the above.

The rate aspect has a feature substantially determined from the selected rate. In some embodiments, the rate aspect is implemented by rate transitions having a timing corresponding to the selected rate. The rate transitions may define a high violation pulse, or a data sample portion, which may even replicate at least one data sample.

At next block 1440, data is transmitted at the selected rate.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

The invention claimed is:

1. An RFID reader configured to transmit:
a first data transmitted at a first rate, and
a first preamble to the first data, the first preamble including at least two low pulses of different durations, wherein
a compliant one of the low pulses has a duration according to the first rate, and
a non-compliant one of the low pulses has a duration between a preset minimum and a preset maximum value.

2. The reader of claim 1, wherein
one of the low pulses has a duration that is approximately an integer multiple of the duration of the other low pulse.

3. The reader of claim 1, wherein
the non-compliant one of the low pulses is transmitted before the compliant low pulse.

4. The reader of claim 1, wherein
the non-compliant one of the low pulses has a duration that is approximately an integer multiple of the duration of the compliant low pulse.

5. The reader of claim 1, wherein
the non-compliant one of the low pulses has a duration of one of approximately 12.5 μsec and approximately 6.25 μsec.

6. The reader of claim 1, further configured to transmit:
a second data at a second rate different than the first rate, and
a second preamble to the second data.

7. The reader of claim 6, wherein
the reader further includes an interference detection module, and
one of the first rate and the second rate is selected according to an output of the module.

8. The reader of claim 6, wherein
the first and second rates are two of approximately 32 kbps, approximately 64 kbps, and approximately 128 kbps.

9. The reader of claim 6, wherein
the first and second rates are two of approximately 40 kbps, approximately 80 kbps, and approximately 160 kbps.

10. The reader of claim 6, wherein
the first and second rates include at least two of approximately 26.7 kbps, approximately 53.3 kbps, and approximately 106.7 kbps.

11. The reader of claim 6, wherein
the second preamble includes low pulses all of which have durations according to the second rate.

12. The reader of claim 6, wherein the second preamble has plurality of low pulses of equal durations.

13. The reader of claim 6, further configured to transmit:
a third data at a third rate, and
a third preamble to the third data.

14. The reader of claim 6, wherein
the second preamble includes at least two low pulses of different durations, and
a compliant one of the low pulses of the second preamble has a duration according to the second rate.

15. The reader of claim 14, wherein
a non-compliant one of the low pulses occurs before the compliant low pulse.

16. The reader of claim 14, wherein
a non-compliant one of the low pulses has a duration that is approximately an integer multiple of the duration of the compliant low pulse.

17. The reader of claim 14, further configured to transmit:
a third data at a third rate, and
a third preamble to the third data.

18. An RFID reader configured to transmit:
a first data transmitted at a first rate, and
a first preamble to the first data, the first preamble including at least two low pulses of different durations, wherein
a compliant one of the low pulses has a duration according to the first rate, and
a non-compliant one of the low pulses is transmitted before the compliant low pulse.

19. The reader of claim 18, wherein
the non-compliant one of the low pulses has a duration that is approximately an integer multiple of the duration of the compliant low pulse.

20. The reader of claim 18, further configured to transmit:
a second data at a second rate different than the first rate, and
a second preamble to the second data.

21. The reader of claim 20, wherein
the reader further includes an interference detection module, and
one of the first rate and the second rate is selected according to an output of the module.

22. The reader of claim 20, wherein
the second preamble includes at least two low pulses of different durations, and
a compliant one of the low pulses of the second preamble has a duration according to the second rate.

23. The reader of claim 20, further configured to transmit:
a third data at a third rate, and
a third preamble to the third data.

24. An RFID reader communicating with an RFID tag, the reader comprising:
means for selecting one of a first rate and a second rate;
means for transmitting a first preamble to first data that includes at least two low pulses of different durations, wherein
a compliant one of the low pulses has a duration according to the selected rate, and
a non-compliant one of the low pulses has a duration between a preset minimum and a preset maximum value; and
means for transmitting the first data at the selected rate.

25. The reader of claim 24, wherein
the selecting means includes means for detecting whether there is interference.

26. The reader of claim 24, wherein
the first and the second rates have values in a continuous range between two endpoints, the endpoints including two of approximately 32 kbps, approximately 64 kbps, and approximately 128 kbps.

27. The reader of claim 24, wherein
the first and the second rates have values in a continuous range between two endpoints, the endpoints including two of approximately 40 kbps, approximately 80 kbps, and approximately 160 kbps.

28. The reader of claim 24, wherein
the first and the second rates have values in a continuous range between two endpoints, the endpoints including two of approximately 26.7 kbps, approximately 53.3 kbps, and approximately 106.7 kbps.

29. The reader of claim 24, wherein
a non-compliant one of the low pulses is transmitted before the compliant low pulse.

30. An RFID reader communicating with an RFID tag, the reader comprising:
means for selecting one of a first rate and a second rate;
means for transmitting a first preamble to first data that includes at least two low pulses of different durations, wherein
a compliant one of the low pulses has a duration according to the selected rate, and
a non-compliant one of the low pulses is transmitted before the compliant low pulse; and
means for transmitting the first data at the selected rate.

31. The reader of claim 30, wherein
the non-compliant one of the low pulses has a duration that is approximately an integer multiple of the duration of the compliant low pulse.

32. The reader of claim 30, further comprising:
means for transmitting a second data at a second rate different than the first rate, and
means for transmitting a second preamble to the second data.

33. The reader of claim 32, further comprising:
means for detecting interference, wherein
one of the first rate and the second rate is selected according to an output of the means for detecting interference.

34. The reader of claim 32, wherein
the second preamble includes at least two low pulses of different durations, and
a compliant one of the low pulses of the second preamble has a duration according to the second rate.

35. The reader of claim 32, further comprising:
means for transmitting a third data at a third rate, and
means for transmitting a third preamble to the third data.

36. A method for an RIFD reader communicating with an RIFD tag, comprising:
transmitting a first preamble to first data that includes at least two low pulses of different durations; and
transmitting the first data at a first rate, wherein
a compliant one of the at least two low pulses has a duration according to the first rate, and
a non-compliant one of the low pulses has a duration between a preset minimum and a preset maximum value.

37. The method of claim 36, wherein
a non-compliant one of the low pulses is transmitted before the compliant low pulse.

38. The method of claim 36, wherein
the non-compliant one of the low pulses has a duration of one of approximately 12.5 μsec and approximately 6.25 μsec.

39. The method of claim 36, further comprising:
transmitting a second preamble to second data; and
transmitting the second data at a second rate different than the first rate.

40. The method of claim 39, further comprising:
detecting whether there is interference; and
selecting one of the first rate and the second rate depending on whether interference is detected.

41. The method of claim 39, wherein
the first and the second rates are two of approximately 32 kbps, approximately 64 kbps, and approximately 128 kbps.

42. The method of claim 39, wherein
the first and the second rates are two of approximately 40 kbps, approximately 80 kbps, and approximately 160 kbps.

43. The method of claim 39, wherein
the first and the second rates include at least two of approximately 26.7 kbps, approximately 53.3 kbps, and approximately 106.7 kbps.

44. The method of claim 39, wherein
the second preamble has a low pulse of a duration substantially similar to a duration of a pulse of the first preamble.

45. The method of claim 39, further comprising:
transmitting a third preamble to the third data; and
transmitting the third data at a third rate different than the first rate and the second rate.

46. The method of claim 39, wherein
the second preamble includes at least two low pulses of different durations, and
a compliant one of the low pulses of the second preamble has a duration according to the second rate.

47. The method of claim 46, further comprising:
transmitting a third preamble to the third data; and
transmitting the third data at a third rate different than the first rate and the second rate.

48. A method for an RIFD reader communicating with an RIFD tag, comprising:
transmitting a first preamble to first data that includes at least two low pulses of different durations; and
transmitting the first data at a first rate, wherein
a compliant one of the at least two low pulses has a duration according to the first rate, and
a non-compliant one of the low pulses is transmitted before the compliant low pulse.

49. The method of claim 48, wherein
one of the low pulses has a duration that is approximately an integer multiple of the duration of the other low pulse.

50. The method of claim 48, further comprising:
transmitting a second data at a second rate different than the first rate, and
transmitting a second preamble to the second data.

51. The method of claim 50, wherein
detecting whether there is interference; and
selecting one of the first rate and the second rate depending on whether interference is detected.

52. The method of claim 50, further comprising:
transmitting a third data at a third rate, and
transmitting a third preamble to the third data different than the first rate and the second rate.

* * * * *

UNITED STATES PATENT AND TRADEMARK OFFICE
CERTIFICATE OF CORRECTION

| | | |
|---|---|---|
| PATENT NO. | : 7,973,643 B2 | Page 1 of 1 |
| APPLICATION NO. | : 10/890662 | |
| DATED | : July 5, 2011 | |
| INVENTOR(S) | : Hyde et al. | |

It is certified that error appears in the above-identified patent and that said Letters Patent is hereby corrected as shown below:

Please delete "co-pending" column 1, line 13 before "U.S.", therefor.

Please delete "kpbs," on column 5, line 15 and insert -- kbps, --, therefor.

Please delete "As mentioned above, rates may change even as the environment changes. Accordingly, the same reader may end up transmitting at a first data rate, then at a second data rate. For the example, in FIG. 1, each of pulses 112, 113 may include a preamble and associated data, the data being at different rates. In each case, the preamble may warn of the upcoming rate, as shown for example in FIG. 8, FIG. 9, FIG. 10, FIG. 11, FIG. 12, FIG. 13, so that the tags can adjust."
on column 8, line 41-48 below "adjust", therefor.

Please delete "RIFD" in claim 36, on column 11, line 47 and insert -- RFID --, therefor.

Please delete "RIFD" in claim 36, on column 11, line 48 and insert -- RFID --, therefor.

Please delete "RIFD" in claim 48, on column 12, line 38 and insert -- RFID --, therefor.

Please delete "RIFD" in claim 48, on column 12, line 39 and insert -- RFID --, therefor.

Signed and Sealed this
First Day of May, 2012

David J. Kappos
*Director of the United States Patent and Trademark Office*